United States Patent [19]
Carlson et al.

[11] 4,337,800
[45] Jul. 6, 1982

[54] TWO PIECE EXTRUDED HOSE

[75] Inventors: Lennart L. Carlson, Irvine; Douglas I. Hoiberg, San Clemente, both of Calif.

[73] Assignee: Steward Plastics, Inc., Laguna Hills, Calif.

[21] Appl. No.: 166,344

[22] Filed: Jul. 7, 1980

[51] Int. Cl.³ .............................................. F16L 11/11
[52] U.S. Cl. .................................... 138/122; 138/129; 138/154; 138/135
[58] Field of Search ............... 138/120, 121, 122, 129, 138/154, 134, 135, 136, 150

[56] References Cited

U.S. PATENT DOCUMENTS

| 1,270,579 | 6/1918 | Witzenmann | 138/122 |
| 1,928,118 | 9/1933 | Taylor | 138/150 |
| 2,731,040 | 1/1956 | Warburton | 138/129 |
| 3,112,771 | 12/1963 | Bringolf | 138/122 X |
| 3,255,780 | 6/1966 | Squirrell | 138/122 |
| 3,273,600 | 9/1966 | Swan | 138/122 |
| 3,890,181 | 6/1975 | Stent et al. | 138/122 X |
| 4,233,097 | 11/1980 | Stahl | 138/122 X |

FOREIGN PATENT DOCUMENTS 811517 4/1959 United Kingdom .
906507 9/1962 United Kingdom .

Primary Examiner—John J. Love
Assistant Examiner—Daniel P. Stodola

[57] ABSTRACT

A flexible hose and method for making same, suitable for cleaning swimming pools and general vacuum applications, having contiguous turns of an extruded helical plastic bead. The strip has thin flange and leg members for receiving the bead that provide excellent crush resistant strength in I-beam fashion while providing a high degree of flexibility.

3 Claims, 6 Drawing Figures

U.S. Patent  Jul. 6, 1982  4,337,800
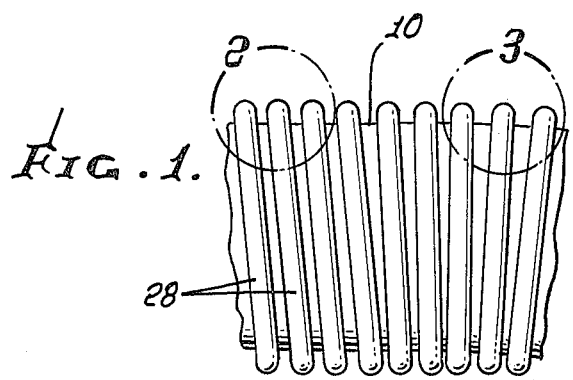
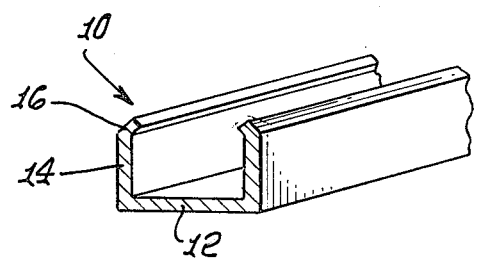
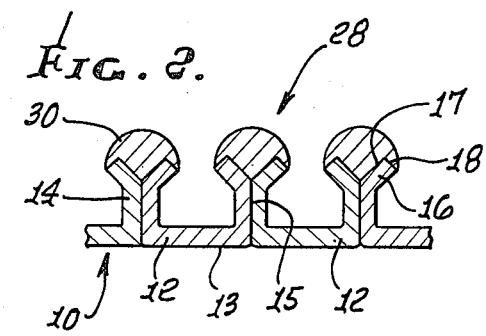
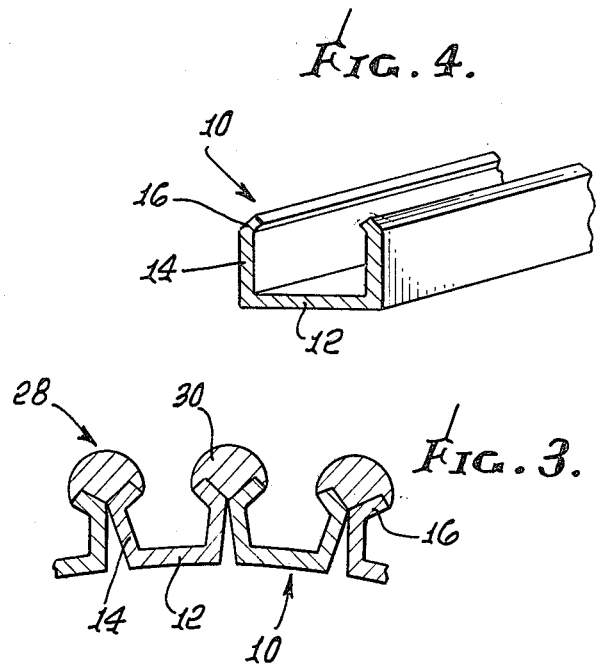
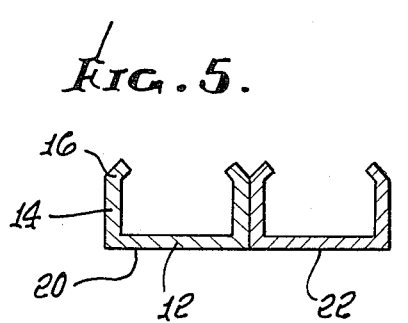
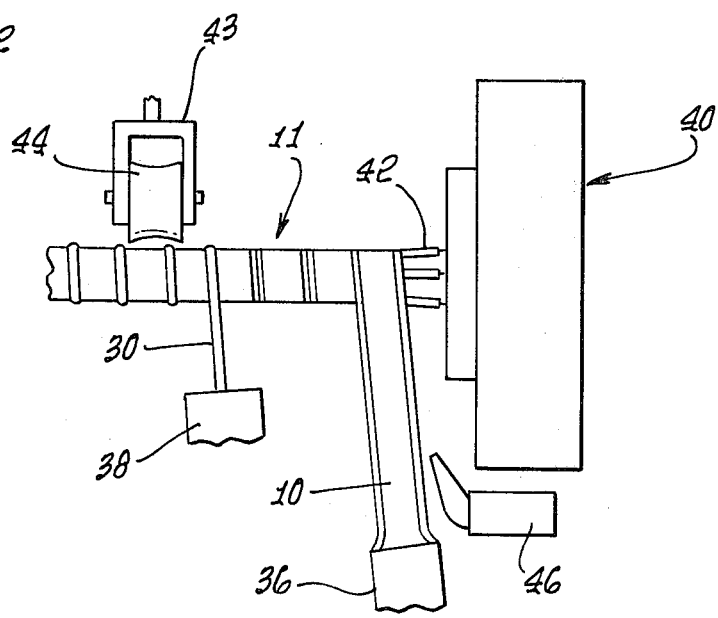

TWO PIECE EXTRUDED HOSE

BACKGROUND OF THE INVENTION

1. Field of the Invention

The present invention relates in general to a reinforced, flexible plastic hose construction, and method for making same, suitable for use in cleaning swimming pools, air vacuum systems, and other duct applications. More specifically, it relates to a flexible hose having contiguous turns of an extruded plastic strip that are sealed and bonded together by an extruded helical bead.

2. Description of the Prior Art

Vacuum apparatus used for drawing liquid and foreign particles through the apparatus (i.e., maintenance of swimming pools), or for very low air pressure systems, require a strong, non-collapsible, yet flexible hose that is light in weight.

Conventional hoses provide a degree of flexibility and are constructed of metal or plastic material. The metal hose normally is a strip of metal wound into a helix and is covered with a plastic sheet material. These metal hoses provide a number of disadvantages. The hose is heavy for application to certain uses (i.e., cleaning swimming pools). The hose will sink to the bottom of the pool and is extremely difficult to position for proper use. Furthermore, the flexibility or elasticity is restricted since the metal may not readily return to its original shape after being bent and the tensile strength of the hose may be weak due to poor bonding of adjacent metal turns.

Plastic hoses are both lighter and more flexible. Conventional plastic hoses have an interlocking arrangement wherein each turn overlays and mates with the adjacent turn forming a rib. A hot seal of plastic material may be added between overlays of adjacent turns and a separate extruded strip of plastic may be used to cap the rib.

U.S. Pat. No. 3,255,780, discloses a conventional helically wound and helically ribbed plastic hose of the foregoing general nature. A hook-shaped portion on a first side of a plastic strip engages a leg member on a second side of the plastic strip, the leg member being from the preceeding helical, or adjacent, turn. A hot seal is inserted between the leg member and the hook-shaped portion. U.S. Pat. No. 2,731,040, discloses an interlocking arrangement without a bead and U.S. Pat. No. 3,273,600, discloses the use of a separate strip as a cap which is sealed to the leg member by a hot seal.

A disadvantage of this interlocking arrangement is that it creates additional bulk in the rib reducing flexibility. Also the additional cap of plastic adds more bulk and increases both the weight and cost of the hose.

Accordingly, it is an object of the invention to provide a new hose and method for making a hose which is light in weight, flexible, less costly to manufacture and which has thin, flexible ribs providing increased strength.

Another object is to provide a rib construction with a more readily inspectable design over the prior art.

SUMMARY OF THE INVENTION

A plastic hose having a first channel-shaped member having side walls with inwardly turned outer edges formed into a multiturn helix and a second member bonded with said outer edges of adjacent turns, for use in vacuum applications. The side walls and bond form a rib whose construction is similar to an I-beam providing crush resistant strength. The side wall, due to the I-beam configuration, may be considerably thinner providing a high degree of hose flexibility. The reduced bulk of the rib produces a lighter hose, and because of the low density of the plastic material, floats when placed in liquid.

A method of making a flexible plastic hose including extruding a first channel-shaped member having side walls with inwardly turned outer edges, forming the first member into a multiturn helix, and extruding a second member into the groove formed by the outer edges of the helical first member bonding the second member to the outer edges of adjacent first members. The first member may be cooled prior to forming the multiturn helix.

BRIEF DESCRIPTION OF THE DRAWINGS

FIG. 1 is a view of a length of flexible plastic hose incorporating the presently preferred embodiment of the invention;

FIG. 2 is an enlarged, fragmentary sectional view taken within zone 2 of FIG. 1;

FIG. 3 is an enlarged, fragmentary sectional view taken within zone 3 of FIG. 1;

FIG. 4 is an enlarged, perspective view of the extruded plastic strip that forms the body of the hose of FIG. 1;

FIG. 5 is an enlarged, fragmentary sectional view showing how the turns of the plastic strip abut in a contiguous manner; and FIG. 6 is a view of an apparatus for making the hose of the present invention.

DESCRIPTION OF THE PREFERRED EMBODIMENT

Referring to FIG. 1, a hose constructed in accordance with the invention is shown in a slightly flexed position. The hose has a plastic strip 10 (generally shown in FIG. 4) in a multiturn helix, formed as by winding on a mandrel 42 (FIG. 6) to place the adjacent turns, such as 20, 22, in contiguous or abutting relation, as shown in FIG. 5. A rib 28 is formed providing crush resistant strength without substantially restricting the flexibility of the hose.

The strip 10 includes a web 12 and radially outwardly directed flanges 14 terminating in legs 16. The surface 13 of the web 12 and the surfaces 15 of the flanges 14 preferably are at right angles so that when the hose is not flexed (as in FIG. 2), a smooth cylindrical bore is presented.

The helical bead 30 is bonded to outward facing surface 17 and end surface 18 of the legs 16. The flanges 14, legs 16, and bead 30 combine to form the rib 28.

When the hose is straight, the webs 12 meet, forming a smooth surface as shown in FIG. 2. When the hose is flexed, the wall on the outside of the curve is stretched and the webs are separated, as shown in FIG. 3. However, the adjacent strips are held together by the bead 30. The plastic of the strip 10 preferably is flexible so that the web 12 may bow when the hose is bent.

The ribs 28 give a relatively high crush resistant strength to the hose, despite the relatively thin walls of the web 12 and flange 14. The sealed together legs 16 of adjacent plastic strips, in combination with the flanges 14 and webs 12 thereof, form a generally I-beam configuration, providing increased strength over a straight walled rib as found in the prior art. This strength gained from the I-beam configuration allows the flange 14 to be constructed of relatively slight thickness providing for increased flexibility over the hose of the prior art, while the bead 30 may be constructed of a harder, more sturdy material providing increased durability. The resultant hose has relatively high flexibility with relatively high compression strength, so that the hose is readily bent without closing off the passage therethrough.

The plastic strip 10 and bead 30 of the present invention may be of any elastomeric material; however, best results are obtained when a polyethylene or ethylene vinyl acetate or a copolymer of polyethylene and ethylene vinyl acetate is used. These materials provide for flexibility and are light, allowing the hose to float in water (i.e., swimming pool). Furthermore, the bond between the strip 10 and the bead 30 when made of these materials provides strength and durability.

The hose may be manufactured by first extruding the plastic strip 10 from an extruder 36, which may be conventional in design and operation, and preferably cooling the extrudant by water from a cooling unit 46. The strip 10 is wound into a multiturn helix 11, as on the mandrel of a winding machine 40, which may be conventional in design and operation. Each turn of the strip is wound so as to have a flange 14 abutting the flange 14 of the preceding turn, as shown in FIG. 5.

The bead 30, preferably of thermoplastic material which is heat bondable, is extruded from another extruder 38 and wound in its heated state onto the strips 10 in the grooves formed by adjacent legs 16 completing the bond between strips 10 and bead 30. A roller frame 43 contains a roller 44, typically having an axis parallel to the axis of rotation of the winding machine 40, which may be used to apply pressure to the bead 30, shaping the bead 30 and improving contact with the legs 16. The hose is then further cooled and cut to a predetermined length.

What is claimed is:

1. A flexible hose of wound helical turns comprising:
a web forming a substantially smooth bore of the hoses, said web having first and second sides;
spaced flanges projecting radially outward from each of said first and second sides of said web, with adjacent flanges of succeeding turns arranged in contiguous pairs;
a leg projecting as an extension of each of said flanges with the legs of the spaced flanges of the web angled inward toward each other with the legs of contiguous pairs of flanges forming a helical groove;
and
a bead wound in said helical groove over said legs of adjacent turns, with said bead bonded to said legs and with said flanges of contiguous pairs separable, allowing said webs to move apart when axial tension is applied to the hose.

2. The hose of claim 1 wherein said flanges project radially outward at substantially a right angle to said web, forming a structure of high crush resistant strength similar to an I-beam.

3. A flexible hose comprising:
an extruded plastic strip of channel-shaped cross section including a web forming the inside of the hose, said web having first and second sides, spaced flanges projecting radially outward from each of said first and second sides of said web, said legs substantially forming an I-beam arrangement with said web and flanges, said plastic strip being helically wound to form the hose, with the flanges of succeeding turns arranged in contiguous pairs and the flanges being angularly flexible with respect to the webs such that the contiguous pairs of flanges are free to move apart at their innermost ends whereby, on application of axial tension, the adjacent webs of each turn are permitted to separate.

* * * * *